Jan. 13, 1925.

W. G. WALTERS 1,523,321

SANITARY GARBAGE CAN

Filed March 30, 1923    2 Sheets-Sheet 1

W. G. Walters
INVENTOR

BY Victor J. Evans
ATTORNEY

Jan. 13, 1925. 1,523,321
W. G. WALTERS
SANITARY GARBAGE CAN
Filed March 30, 1923 2 Sheets-Sheet 2

W. G. Walters
INVENTOR
BY Victor J. Evans
ATTORNEY

Patented Jan. 13, 1925.

1,523,321

UNITED STATES PATENT OFFICE.

WILLIAM GRAY WALTERS, OF SAN ANTONIO, TEXAS.

SANITARY GARBAGE CAN.

Application filed March 30, 1923. Serial No. 628,826.

*To all whom it may concern:*

Be it known that I, WILLIAM G. WALTERS, a citizen of the United States, residing at San Antonio, in the county of Bexar and State of Texas, have invented new and useful Improvements in Sanitary Garbage Cans, of which the following is a specification.

This invention relates to receptacles especially designed for refuse, such as garbage, trash and the like and has for an object the provision of a strong, durable receptacle which may be placed in a conspicuous place and which in addition to receiving refuse, will provide means for the display of advertising matter.

Another object of the invention is the provision of a receptacle from which the contents may be easily and quickly removed, whereby the said receptacle may be kept in a sanitary condition and free from objectionable odors.

With the above and other objects in view, the invention further includes the following novel features and details of construction, to be hereinafter more fully described, illustrated in the accompanying drawings and pointed out in the appended claim.

In the drawings:—

Figure 1:
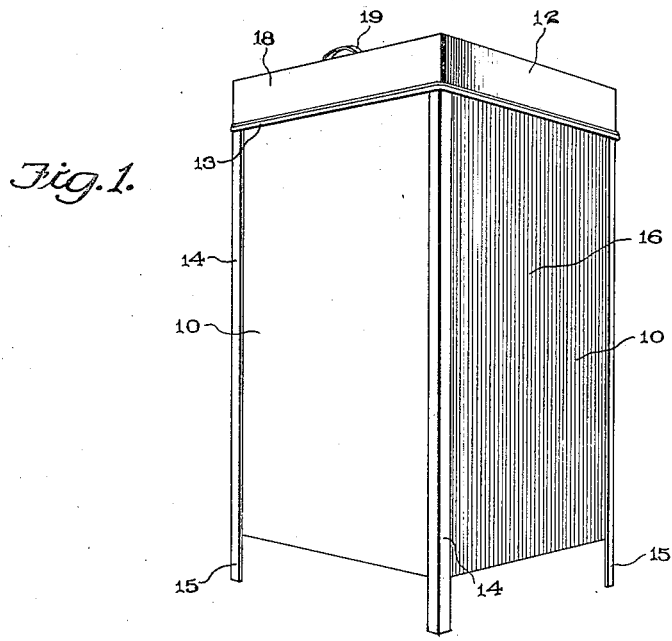
Figure 1 is a perspective view of the receptacle.
Figure 2:
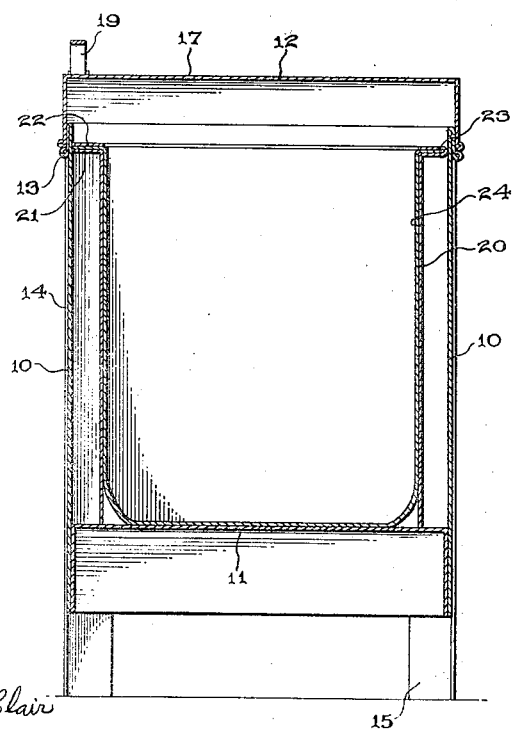
Figure 2 is a vertical sectional view of the same.
Figure 3:
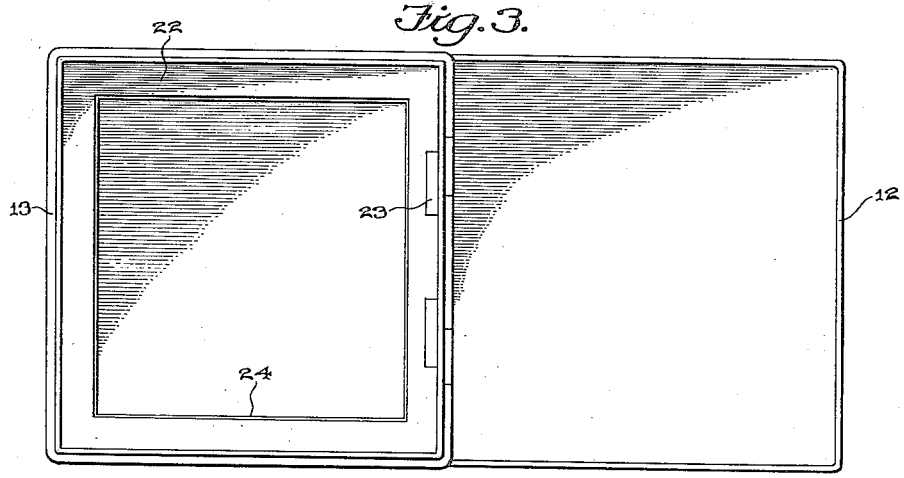
Figure 3 is a plan view with the cover raised.

Referring in detail to the drawings, wherein like characters of reference denote corresponding parts, the invention is shown as comprising a receptacle which is rectangular in plan and which includes side walls 10 and a bottom wall 11. The upper open end of the receptacle is adapted to be closed by a flanged lid or cover 12 whose edges engage a bead 13 which surrounds the upper portion of the receptacle.

Each vertical edge of the receptacle is provided with an angular reinforcing strip 14 which extends below the lower edge of the receptacle and provides supporting legs 15, whereby the bottom of the receptacle may be slightly elevated. The sides of the receptacle provide panels 16, while the top or cover provides panels 17 and 18 for the display of advertising matter, so that the invention in addition to being useful for the collection of refuse, may be also utilized to provide a source of income. The top is preferably provided with a handle or grip 19.

The bottom 11 of the receptacle may or may not be spaced above the lower edge of the side walls 10 as shown. Resting upon this bottom is a supporting member 20 which may be of rectangular shape and which comprises side walls which are spaced from the walls 10. The supporting member 20 is removably positioned within the receptacle and is provided around its upper edge with substantially horizontally disposed flanges 21 whose outer edges engage the walls 10 of the receptacle and space the walls 20 therefrom. The flanges 21 are primarily intended to cooperate with a rectangular frame 22, the latter being hinged to one of the flanges 21 as shown at 23 and provides a clamping flange, by means of which an inner receptacle 24 may have its upper edge secured to the supporting member 20. The inner receptacle 24 may be in the form of a relatively heavy paper bag or sack whose mouth is held in open position by attachment to the supporting member 20 and whose bottom if desired, may rest upon the bottom 11 of the outer receptacle.

The invention may be placed at suitable advantageous points for the collection of refuse which may be deposited within the inner receptacle 24 by raising the lid or cover 12. The refuse may then be collected by removing the inner receptacle 24, which, owing to its inexpensive character may be suitably disposed of with the refuse and a new inner receptacle substituted. Thus, the invention provides means whereby the refuse may be collected and disposed of in a sanitary manner and the receptacle kept in an ordorless and sanitary condition.

Figure 5:
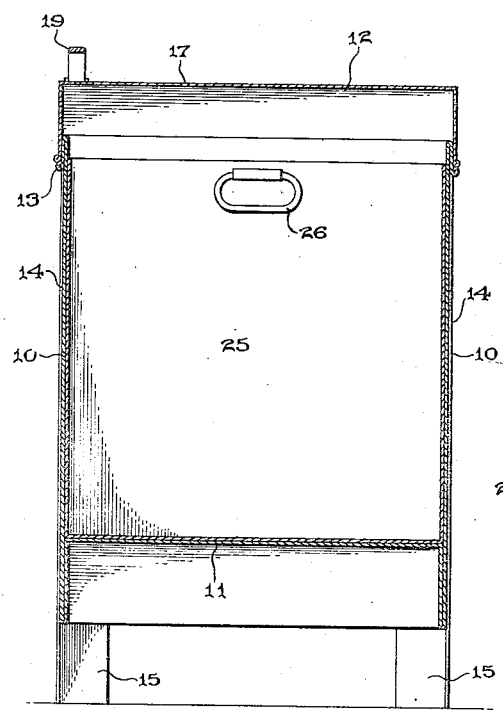
Figure 5 is a vertical sectional view illustrating a modified form of the invention.
Figure 4:
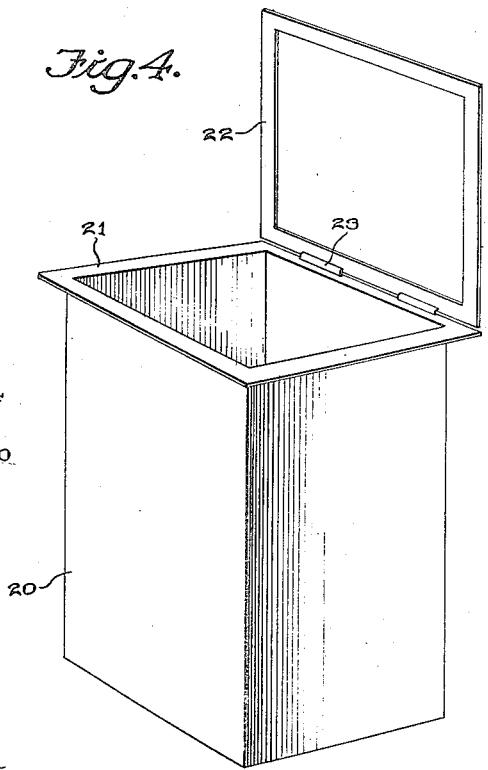
Figure 4 is a detail perspective view of the supporting member with the clamping frame raised.

In Figure 5 of the drawings there is illustrated a modified form of the invention in which the supporting member 20 is dispensed with and the inner receptacle 25 made of sheet metal or other suitable material. The refuse may be deposited within this inner receptacle 25 and the latter removed and dumped for suitable disposal. The receptacle 25 is preferably provided with suitable hand holds 26 for convenience in handling.

The invention is susceptible of various changes in its form, proportions and minor details of construction and the right is herein reserved to make such changes as properly fall within the scope of the appended claim.

Having described the invention what is claimed is:—

In a receptacle, an outer container, a cover therefor, a supporting member located within the container, an inner container and means for removably securing the inner container within the supporting member.

In testimony whereof I affix my signature.

WILLIAM GRAY WALTERS.